J. H. DOWNING.
HARVESTER.
APPLICATION FILED APR. 15, 1911.
1,030,652.
Patented June 25, 1912.
2 SHEETS—SHEET 1.
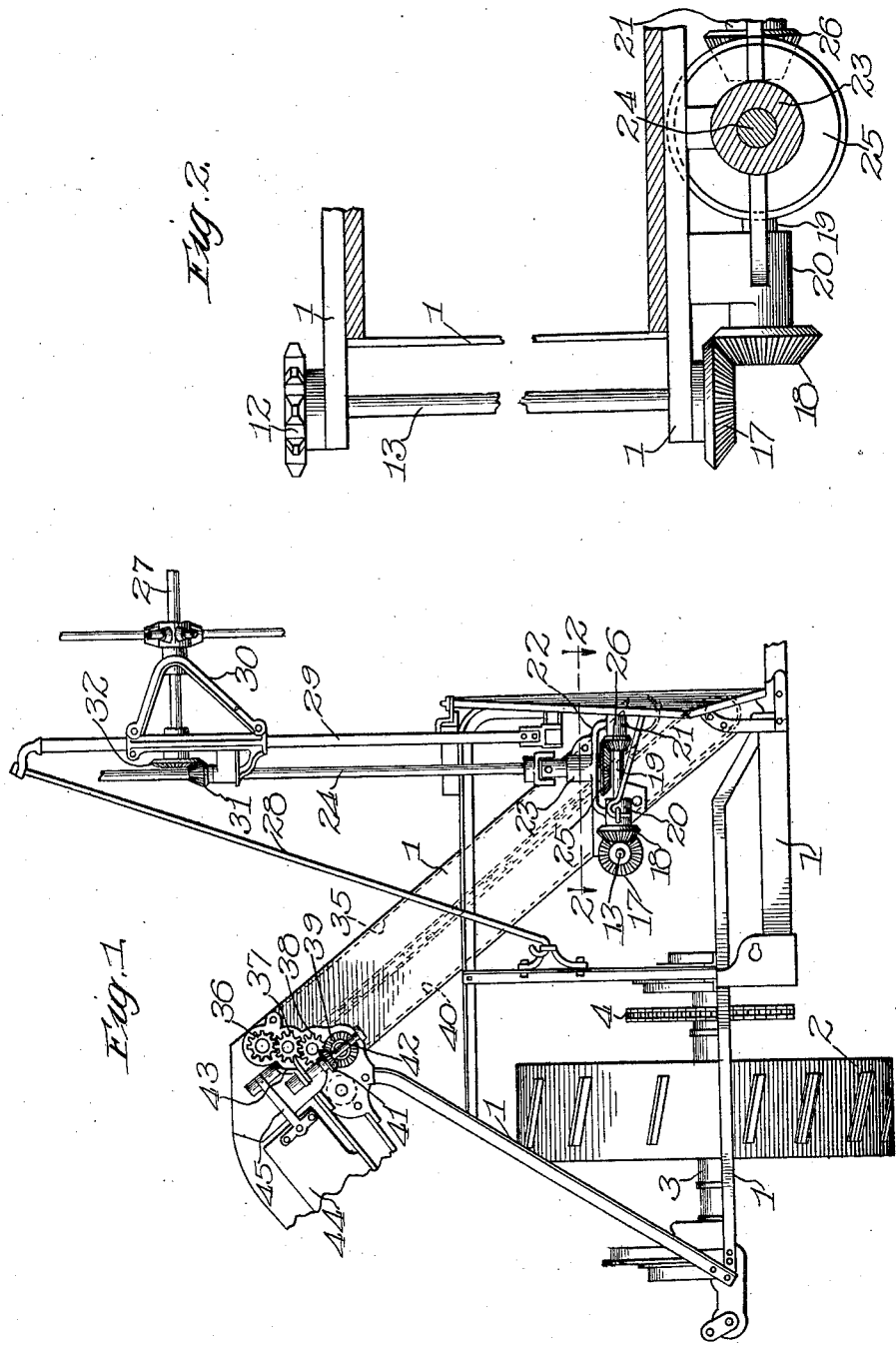

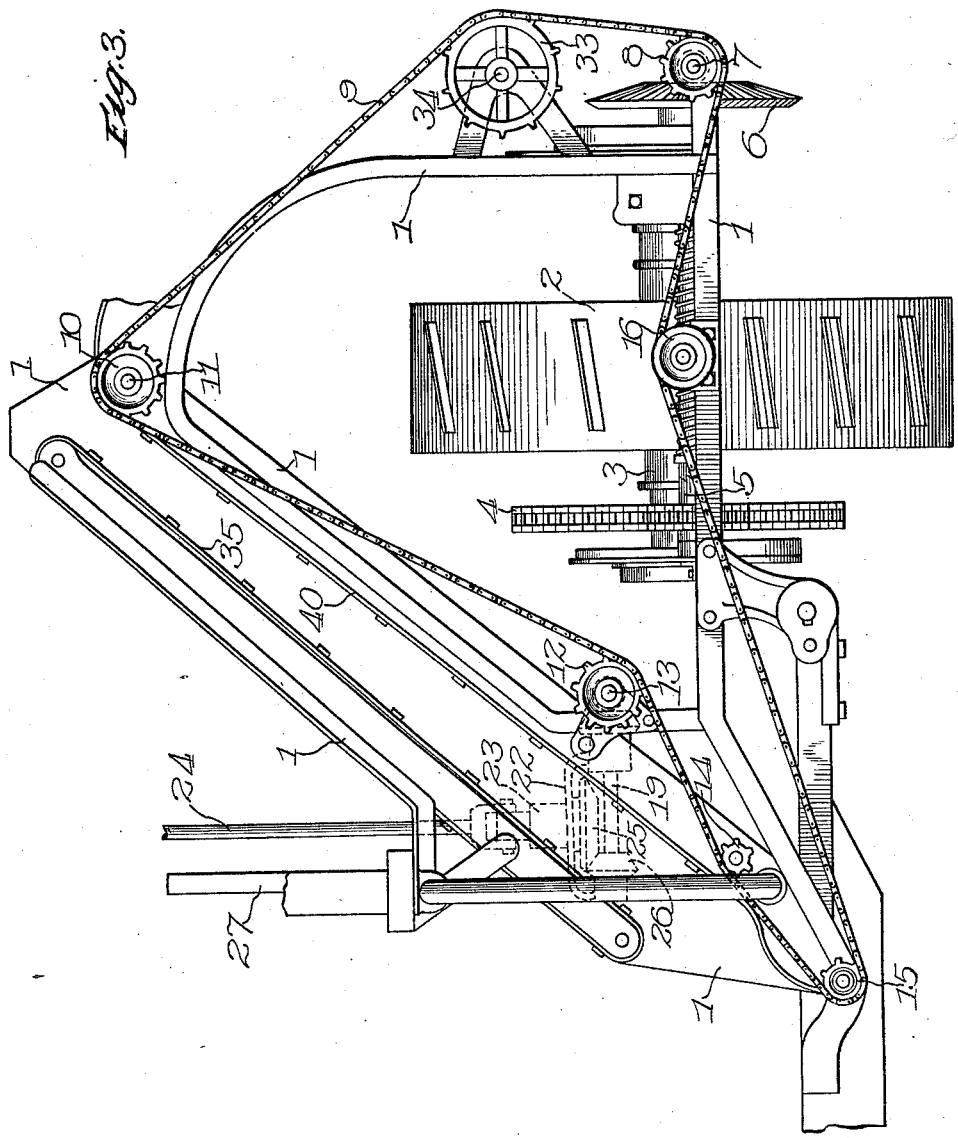

UNITED STATES PATENT OFFICE.

JOHN H. DOWNING, OF STILLWATER, MINNESOTA, ASSIGNOR TO THE STATE OF MINNESOTA.

HARVESTER.

1,030,652.      Specification of Letters Patent.      Patented June 25, 1912.

Application filed April 15, 1911. Serial No. 621,248.

*To all whom it may concern:*

Be it known that I, JOHN H. DOWNING, a subject of the King of England, residing at Stillwater, in the county of Washington and State of Minnesota, have invented certain new and useful Improvements in Harvesters, of which the following is a full, clear, and exact specification.

This invention relates to harvesters, or more particularly to grain binding machines.

The primary object of the invention is to provide an improved construction in machines of this character to render the same more efficient in operation.

A further object of the invention is to provide improved means which are simple and compact for driving the reel, the upper and lower elevators and the adjuster, all of the moving parts of the machine being operated from a single driving element.

A further object of the invention is to provide a harvester having an improved gear drive which shall present a neater and more compact appearance than heretofore obtained by mechanism commonly in use when the reel is operated through the intermediary of other moving parts of the harvester such as the elevator rollers instead of directly from the driving element.

To the attainment of these ends and the accomplishment of certain other new and useful objects which will hereinafter appear, the invention consists in the features of novelty hereinafter described and shown in the accompanying drawings forming a part of this specification, and finally pointed out more specifically in the claims.

In the said drawings—Figure 1 is a view in elevation of a portion of the front of a harvester to which the invention is applied. Fig. 2 is a plan view in section on the line 2—2 Fig. 1. Fig. 3 is a rear view of a portion of a machine to which the invention is applied.

The main frame of the harvester is represented by the numeral 1, the drive wheel by 2.

3 is the axle of the driving wheel to which is secured the main driving sprocket 4 which transmits motion to the driven counter shaft 5 in any well known manner, as by the chain and a driven sprocket secured to counter shaft 5. The counter shaft 5 is journaled to rotate in main frame 1, and is provided at its outer extremity with the bevel gear 6 in mesh with the bevel pinion on driving shaft 7, which is also journaled in the main frame at right angles to the axis of the drive wheel 2, and is provided at its rearmost extremity with a fixed sprocket wheel 8, over which passes the single driving element consisting of the sprocket chain 9. This sprocket chain 9 passes upwardly over sprocket wheel 33 on packer shaft 34, over sprocket wheel 10 secured rigidly to the rearward end of and driving the upper roller of the lower elevator canvas, the shaft or gudgeon of such roller being indicated by the reference character 11. Thence the sprocket chain 9 passes downwardly and is deflected around the under side of sprocket wheel 12, which is rigidly secured to and drives the counter shaft 13 journaled in suitable bearings on the main frame and extending from the rear of the machine to the front thereof, as shown more clearly in Fig. 2. After being deflected around the under side of sprocket wheel 12, the driving chain 9 passes over the upper side of the idler roller 14, thence around sprocket wheel 15, driving the inside roller of the platform canvas, and thence passes over the usual idler 16 to the driving sprocket 8. The shaft 13, as already stated, passes from the rear toward and through the front side of the main frame or elevator frame of the machine, and is provided at its forward extremity with a bevel gear 17 fixed to rotate therewith, and in mesh with a suitable bevel gear 18 on counter shaft 19, which is mounted in suitable bearings 20, 21 secured to the forward side of the elevator on the main frame of the machine. The bearings 20, 21 are preferably formed as parts of an integral casting or spider, as indicated at 22, Fig. 1, the same being provided with a vertically extending journal bearing 23 for the lower end of the vertical reel driving shaft 24, the lower extremity of which is provided with a bevel gear 25 meshing with bevel gear 26 on counter shaft 19. The reel itself may be of any desired construction and supported by any of the usual reel supporting devices, such as that illustrated, which consists of the staff 27 secured at its lower extremity to the main frame, and being provided with a supporting rod 28 secured to it near the upper extremity thereof and having connection with the main frame of the harvester.

The shaft 29 of the reel proper is journaled in a suitable bracket 30 preferably slidably mounted on the supporting staff 27 and adjustably controlled by any suitable means, which forms no part of the present invention and is not shown. The reel shaft 29 is driven by connection with the reel driving shaft 24 through bevel gear 31 preferably slidably mounted on shaft 24 and in mesh with bevel gear 32 on reel shaft 29.

Heretofore, it has been the common practice to drive the reel shaft through some connection with the forward ends of the positively driven rollers at the upper ends of the elevators. Such construction has necessitated an expensive construction of roller to transmit motion from the rear to the front thereof, and it has also necessitated some form of mechanical connection from the upper extremity of the forward side of the elevator to the lower side thereof adjacent the lower end of the vertical reel driving shaft. Such driving mechanism has necessarily been exposed to view to the detriment of the appearance of the machine, thus resulting in an awkward mechanical construction. My improved construction is much more compact and presents a much neater appearance, because the power transmitting element consisting of the counter shaft 13 and its connections with the reel driving shaft is concealed on the under side of the elevator, and being entirely disconnected from the elevator driving rollers, is much more efficient in operation because the speed of the rollers is not likely to be acted upon directly to vary their speed by reason of the direct braking effect of the reel when retarded by tangled grain or other conditions external to the machine. Furthermore my improved construction permits the driving of the upper and lower elevator canvases or aprons and the adjuster not only independently of the reel driving mechanism but it permits both rollers at the upper extremities of the elevators to be positively driven avoiding the application of power to the rollers at the lower ends of the elevators and the resulting slack in the operative run of such canvases, by reason of the arrangement of parts which will now be described.

Secured to the forward end of the upper roller of the upper elevator canvas 35 is the gear 36 which drives the lower elevator canvas and the adjuster through intermediate gears 37 and 38, the latter of which is in mesh with the double gear 39 which is secured to the upper roller of the lower elevator canvas 40. The double gear 39 is provided with a bevel or face gear in mesh with bevel gear 41 secured to and operating the adjuster crank shaft 42 journaled in suitable bearing supports on the front of the elevator frame and having the crank 43 at its upper extremity adapted to impart reciprocating movement to the adjuster 44 through the bracket arm 45 pivotally connected with the crank pin thereof. Thus it will be seen that the elevators and the adjuster mechanism for adjusting the butts of the grain are not encumbered with mechanism for directly driving the reel which subjects these parts to much less strain and consequently prolongs the life of these parts, enables them to be made of lighter and cheaper material and renders their operation more uniform and satisfactory.

In order that the invention might be fully understood by those skilled in the art, the details of the preferred form thereof have been specifically described, but it will be apparent that many modifications may be made without departing from the purpose and spirit of the invention.

What I claim as new is:

1. In a harvester, in combination, a single driving element comprising a driving sprocket chain at the rear of the main frame of the machine, upper and lower elevator frames provided with rollers at the upper and lower extremities thereof for carrying the usual elevator canvases, a sprocket wheel secured to the rear end of the upper roller of the lower elevator and driven by the said driving element, means for driving the upper roller of the upper elevator from the said upper roller of the lower elevator, a reel, a shaft journaled in the machine frame and extending from the front to the rear thereof, said shaft having a driving sprocket secured to the rear end thereof in engagement with the driving element, and operative means interposed between the forward end of said shaft and the reel for imparting movement to the reel.

2. In a harvester, in combination, a single driving element at the rear of the machine frame, upper and lower elevator frames provided with rollers at the upper and lower extremities thereof for carrying the usual elevator canvases, means on the rear end of the upper roller of the lower elevator adapted to be engaged by the driving element for operating said roller, means for driving the upper roller of the upper elevator from said upper roller of the lower elevator, a reel, a shaft journaled in the machine frame and extending from the front to the rear thereof and being provided with means at the rear for engagement with the driving element, and operative means interposed between the forward end of said shaft and the reel for imparting movement to the reel.

3. In a harvester, in combination, a single driving element at the rear of the machine frame, upper and lower elevator frames provided with rollers at the upper and lower extremities thereof for carrying the usual elevator canvases, means on the rear end of the upper roller of the lower elevator adapted to be engaged by the driving element for operating said roller, means for driving the upper roller of the upper elevator from said upper roller of the lower elevator, a reel, a shaft journaled in the machine frame and extending from the front to the rear thereof and being provided with means at the rear for engagement with the driving element and operative means between the forward end of said shaft and the reel for imparting movement to the reel, said means comprising a counter-shaft rotatably supported on the machine frame at the forward side of the elevators, coöperating gears on the first said shaft and on the counter-shaft, an approximately vertical reel driving shaft, and coöperating gears on the said counter-shaft and on the vertical reel driving shaft.

4. In a harvester, in combination, a single driving element comprising a driven sprocket chain at the rear of the main frame of the machine, upper and lower elevator frames provided with rollers at the upper and lower extremities thereof for carrying the usual elevator canvases, a sprocket wheel secured to the rear end of the upper roller of the lower elevator and driven by the said driving element, means for driving the upper roller of the upper elevator from the said upper roller of the lower elevator comprising gears on the forward extremities of said rollers and two intermediate coöperating gears one of which is in mesh with each of the gears on said upper rollers on both elevators, a reel, a shaft journaled in the machine frame and extending from the front to the rear thereof, said shaft having a driving sprocket secured to the rear end thereof in engagement with the driving element, and operative means interposed between the forward end of said shaft and the reel for imparting movement to the reel.

5. In a harvester, in combination, a single driving element comprising a driving sprocket chain at the rear of the main frame of the machine, upper and lower elevator frames provided with rollers at the upper and lower extremities thereof for carrying the usual elevator canvases, a sprocket wheel secured to the rear end of the upper roller of the lower elevator and driven by the said driving element, means for driving the upper roller of the upper elevator from said upper roller of the lower elevator comprising gears on the forward extremities of said rollers and two intermediate coöperating gears one of which is in engagement with each of said gears on the elevator rollers, a reel, a shaft journaled in the machine frame and extending from the front to the rear thereof, said shaft having a driving sprocket secured to the rear end thereof in engagement with the driving element, and operative means interposed between the forward end of said shaft and the reel for imparting movement to the reel, said means comprising a counter-shaft journaled at the forward side of the elevators, coöperating gears on the forward end of the first said shaft and on the counter-shaft, and means for imparting movement from said counter-shaft to the reel.

6. In a harvester, in combination, a single driving element comprising a driving sprocket chain at the rear of the main frame of the machine, upper and lower elevator frames provided with rollers at the upper and lower extremities thereof for carrying the usual elevator canvases, a sprocket wheel secured to the rear end of the upper roller of the lower elevator and driven by the said driving element, an adjuster at the forward side of the elevator frames in the upper extremities thereof, means for driving the upper roller of the upper elevator and the said adjuster from the said upper roller of the lower elevator, a reel, a shaft journaled in the machine frame and extending from the front to the rear thereof, said shaft having a driving sprocket secured to the rear end thereof in engagement with the driving element, and operative means interposed between the forward end of said shaft and the reel for imparting movement to the reel.

In testimony whereof I have signed my name to this specification in the presence of two subscribing witnesses, on this 12th day of April A. D. 1911.

JOHN H. DOWNING.

Witnesses:
H. W. DAVIS,
S. D. PORTER.

---

Copies of this patent may be obtained for five cents each, by addressing the "Commissioner of Patents, Washington, D. C."